US005467436A

United States Patent [19]

Rodi et al.

[11] Patent Number: 5,467,436

[45] Date of Patent: * Nov. 14, 1995

[54] CONTROL SYSTEM FOR PRINTING PRESSES

[75] Inventors: Anton Rodi, Leimen; Jürgen Reithofer, Nussloch, both of Germany

[73] Assignee: Heidelberger Druckmaschinen AG, Heidelberg, Germany

[ * ] Notice: The portion of the term of this patent subsequent to Feb. 26, 2008, has been disclaimed.

[21] Appl. No.: 33,427

[22] Filed: Mar. 17, 1993

Related U.S. Application Data

[63] Continuation of Ser. No. 899,097, Jun. 15, 1992, abandoned, which is a continuation of Ser. No. 734,057, Jul. 22, 1991, abandoned, which is a continuation of Ser. No. 516,244, Apr. 30, 1990, abandoned.

[30] Foreign Application Priority Data

Apr. 29, 1989 [DE] Germany .......................... 39 14 238.8

[51] Int. Cl.$^{6}$ .................................................. G06K 15/00

[52] U.S. Cl. ............................................................ 395/114

[58] Field of Search .................................... 395/101, 104, 395/109, 114; 400/71; 101/DIG. 45, 47, 181; 358/296

[56] References Cited

U.S. PATENT DOCUMENTS

| | | | |
|---|---|---|---|
| 4,508,034 | 4/1985 | Bolza-Schünemann | 101/DIG. 47 |
| 4,553,478 | 11/1985 | Greiner et al. | 101/181 |
| 4,754,428 | 6/1988 | Schultz et al. | 364/59 |
| 4,803,634 | 2/1989 | Ohno et al. | |
| 4,955,290 | 9/1990 | Kipphan et al. | 101/365 |

FOREIGN PATENT DOCUMENTS

| | | |
|---|---|---|
| 1223972 | 7/1987 | Canada . |
| 1224668 | 7/1987 | Canada . |
| 2426057 | 12/1974 | Germany . |
| 3630876 | 3/1987 | Germany . |

OTHER PUBLICATIONS

German Publication: "Neue Leitstandtechnik im Zeitungsdruck", Deutscher Drucker, Nr. 30, 24 Sep. 1987 no translation.

Heidelberger Nachrichten: "Mit Heidelberg CPC sicher in die Zukunft", Mar. 1940, p. 23; no translation.

"Programmable Controllers for Rotary Offset Printing Machines", Power Engineering and Automation Systems for the Graphics Industry, Order No. A–19100–E 349–A–153–x–7600, Printed 134240 PA 7852.

*Primary Examiner*—Arthur G. Evans
*Attorney, Agent, or Firm*—Herbert L. Lerner; Laurence A. Greenberg

[57] ABSTRACT

A control system for a printing press includes inputting into a central control apparatus to which a plurality of printing presses are connected data required for controlling a given printing job, and transmitting the data from the central control apparatus to a control device assigned to the given printing press.

19 Claims, 3 Drawing Sheets

CONTROL SYSTEM FOR PRINTING PRESSES

This application is a continuation of application Ser. No. 07/899,097, filed Jun. 15, 1992, now abandoned, which is a continuation of application Ser. No. 734,057, filed Jul. 22, 1991, now abandoned, which application is a continuation of application Ser. No. 516,244, filed Apr. 30, 1990, now abandoned.

BACKGROUND AND PRIOR ART

The invention relates to a control system for printing presses including apparatus for implementing the control system.

For the purpose of controlling printing presses, it has already become known heretofore to read job-related data, which have been recorded on mass storage devices, from the mass storage devices and to transmit the data to a control device assigned to a respective printing press. A mass storage device which has gained preference in this connection is a magnetic-tape cassette, on which it is possible to store not only the data of one particular job, but also the data of a multiplicity of printing jobs (collective job cassette).

A heretofore known data-transfer system for presetting actuators on printing presses according to Canadian Patent 1,223,972, includes a data distributor which permits free data traffic between a collective job cartridge or cassette, actuators of the printing press, a keyboard and a display device. The actuators may then, in a respectively necessary manner, be set or adjusted, based upon the data from the collective job cartridge, new data may be recorded and/or the recorded data, the data to be inputted, and the data that has been supplied to the actuators may be displayed.

The heretofore known data-transfer system, however, is assigned to one particular printing press, so that, in printing shops with several printing presses, several data-transfer systems are required and cartridges or cassettes containing data for the respective job have to be taken from storage and transported to the respective data-transfer system.

It is accordingly an object of the invention of the instant application to provide a system, i.e., a method and apparatus for controlling printing presses wherein the transport of data carriers is largely unnecessary and wherein all information required for the processing-of printing jobs is able to be stored in a central location.

SUMMARY OF THE INVENTION

With the foregoing and other objects in view, there is provided in accordance with the invention, a control system for a printing press, which comprises inputting into a central control apparatus to which a plurality of printing presses are connected data required for controlling a given printing press for a given printing job, and transmitting the data from the central control apparatus to a control device assigned to the given printing press. Thus, the printing presses can be operated individually with the aid of the respectively assigned control devices. These control devices may be constructed in accordance with the requirements of the particular printing press and permit economic operation even when there is only one printing press. The central control apparatus performs higher-ranking tasks, for example, in the sense of operations scheduling.

The control system according to the invention not only renders the transport of data carriers unnecessary, but there also result many further improvements in the processing of printing jobs. Thus, for example, changes in job data can readily be implemented and stored for follow-up jobs. Centralized monitoring of the operation of the printing presses is also possible. When allocating jobs to the individual printing presses, it is also possible, by scanning the counters of the individual printing presses, to estimate when a current job will be finished, so that forward planning can be performed beforehand for a particular printing press. After a printing job has been performed, the data for a follow-up job can be stored and can be used for writing invoices, historical costing or other profitability calculations.

Also, fault messages and error reports can be transferred from the control devices to the central control apparatus, where such information can either be stored or can be retrieved for maintenance or repair operations. Furthermore, it is possible for information to be retrieved via data-communication facilities, so that suitable action can be taken in order to rectify faults.

In accordance with another mode of the invention, there is provided a system which includes transmitting data from the control device to the central control apparatus after the given printing job is completed.

In accordance with a further mode of the invention, there is provided a system which includes transmitting data from the control device to the central control apparatus during the performance of the given printing job.

In accordance with an added mode of the invention, there is provided a system which includes writing the data to a storage device via the central control apparatus, after performing the given printing job on the given printing press, when the given printing job has been performed only for a first time.

In accordance with an additional mode of the invention, there is provided a system which includes, in the event the printing job is a repeat job, reading the data from the storage device and feeding the data from the central control apparatus to the control device of one of the printing presses.

In accordance with again another mode of the invention, there is provided a system which includes, for the repeat printing job, changing the data when one of the printing presses other than the given printing press is selected for performing the repeat printing job.

In accordance with another aspect of the invention, there is provided an apparatus for implementing a system of controlling a printing press, comprising a central control apparatus connected to a plurality of printing presses and including a data-processing system, and data-transfer and processing equipment for transmitting to a control device assigned to a given printing press data required for controlling the given printing press for a given printing job largely independently of the data-processing system.

This construction has the advantage that the data-processing system, which may be a personal computer, is not burdened with the task of data transfer and, if applicable, data storage, but is available for the execution of other programs.

In accordance with again a further feature of the invention, there is provided a device for feeding instructions and data with given operating systems and applications program from the data-processing system to the data-transfer and processing equipment.

In accordance with again an added feature of the invention, the data-transfer and processing equipment comprises a plurality of inputs/outputs for the control devices, respectively, of the printing presses, and an input/output for connection to the data-processing system.

In accordance with again an additional feature of the invention, the data-transfer and processing equipment further includes inputs/outputs, and at least one mass storage device connectible to the last-mentioned inputs/outputs.

In accordance with yet another feature of the invention, the data-transfer and processing equipment further includes an input/output, and a printing-plate reader connectible to the last-mentioned input/output.

In accordance with yet a further feature of the invention, there is provided a print-quality measuring instrument connectible to the control devices for feeding signals thereto.

In accordance with yet an added feature of the invention, there is provided a printing-plate reader connectible to the data-transfer and processing equipment.

In accordance with yet an additional feature of the invention, the data processing system is a personal computer, and the data-transfer and processing equipment is formed as a plug-in card, the plug-in card being insertable into an expansion slot in the personal computer.

In accordance with still another feature of the invention, there is provided a driverless transport system connected to the central control apparatus.

In accordance with a further aspect of the invention, there is provided an apparatus for the implementing a system of controlling a printing press comprising a central control apparatus connected to a plurality of printing presses and including a data-processing system connected via a network to respective personal computers which are, in turn, connected to control devices assigned to the printing presses. Low-cost local networks may thereby be employed for the transfer of the data between the central control apparatus and the control devices for the personal computers of the individual printing presses, respectively.

By the fact that the data-processing system or the personal computer can operate with conventional operating systems and application programs, it is possible for a program for controlling the data-transfer and processing apparatus, in accordance with the control system according to the invention, to be executed compatibly with the other application programs. The transfer of data to the other application programs provide many possibilities for realizing economically efficient plant management.

Other features which are considered as characteristic for the invention are set forth in the appended claims.

Although the invention is illustrated and described herein as embodied in a control system for printing presses, it is nevertheless not intended to be limited to the details shown, since various modifications and structural changes may be made therein without departing from the spirit of the invention and within the scope and range of equivalents of the claims.

BRIEF DESCRIPTION OF THE DRAWINGS

The construction and method of operation of the invention, however, together with additional objects and advantages thereof will be best understood from the following description of specific embodiments when read in connection with the accompanying drawings, in which.

Like parts in both figures are identified by the same reference characters.

DESCRIPTION OF THE PREFERRED EMBODIMENT

Figure 1:
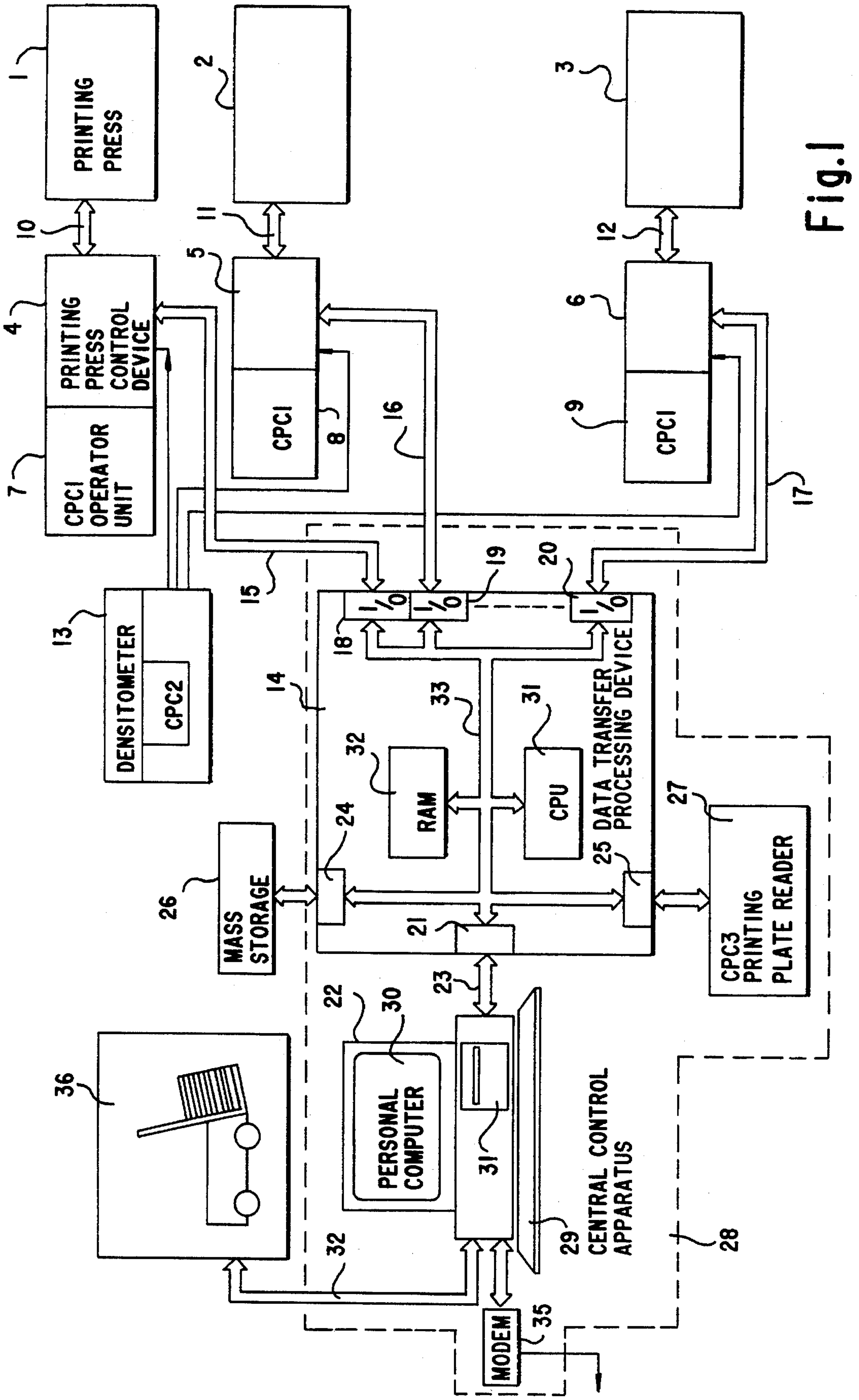
FIG. 1 is a block diagram of a first embodiment of the control system according to the invention.

Referring now to the figures of the drawing in detail and, first, particularly to FIG. 1, there is shown therein, with the control system according to the invention, a row of printing presses, of which only three printing presses 1, 2 and 3 are shown. Each of the printing presses 1, 2 and 3 has a control device 4, 5 and 6, respectively, and an operator unit 7, 8 and 9, respectively, assigned thereto. Particularly suitable for the latter is a remote-control console of the type known as CPC 1-03 of Heidelberger Druckmaschinen AG of Heidelberg, Germany. With the aid of the control devices 4, 5 and 6 and the operator units 7, 8 and 9, it is possible to perform all the required settings on the printing press, such as the presetting of actuators, in particular. For this purpose, the control devices 4, 5 and 6 are connected by control lines 10, 11 and 12, respectively, to the printing presses 1, 2 and 3. Via the control lines 10, 11 and 12, respectively, feedback messages from the printing presses 1, 2 and 3 are also sent to the control devices 4, 5 and 6, respectively.

A densitometer 13, with which the printed sheets can be measured and with which, in addition, any necessary corrections can be sent directly to the respectively concerned control device 4, 5 and 6 are provided for quality inspection and control of the printed products.

In the embodiment shown in FIG. 1, a central control apparatus 28 is made up of a data-transfer and processing device 14 and a personal computer 22, and is connected via lines 15, 16 and 17, respectively, to the control devices 4, 5 and 6. More specifically, the transfer of data between the central control apparatus 28 and the control devices 4, 5 and 6 may be in parallel or in series, depending upon the circumstances. Furthermore, as in the illustrated embodiment of the invention, it is possible to have individual connections for each control unit or to have bus systems and local networks, respectively, for data transfer.

The data-transfer and processing device 14 has a number of inputs/outputs 18, 19 and 20 which correspond to the number of printing presses. In addition, another input/output 21 is provided with which the data-transfer and processing device 14 is connected to the personal computer 22. Preferably, the data-transfer and processing device 14 is in the form of an individual plug-in card, which is disposed in a vacant expansion slot in the personal computer 22 and therein connected to a bus system 23 of the personal computer. In a conventional manner, the personal computer 22 includes among other things, a keyboard 29; a visual display unit 30 for monitor and suitable mass storage devices or memory, such as a floppy-disk drive and a hard-disk drive.

Connected to further inputs/outputs 24, 25 of the data-transfer and processing device 14 are a mass storage or memory device 26 and a printing-plate reader 27. The mass storage device 26 may, for example, be a floppy-disk, a hard-disk or a magnetic-tape storage device. The CPC3 unit of Heidelberger Druckmaschinen AG is suitable as the printing-plate reader.

Basically, the data-transfer and processing device 14 is formed of a microprocessor 31 and a main storage or memory device 32, which are connected to one another and to the inputs/outputs 18, 19, 20, 21, 24, 25 via a bus system 33. The microprocessor 31 controls the flow of information between the control devices 4, 5 and 6, the personal computer 22, the storage device 26 and the printing-plate reader 27, and performs data-processing tasks, such as the interpretation of instructions of the personal computer and the management of the mass storage device 26.

With the aid of conventional operating systems and suitable application programs, data and instructions can be sent from the personal computer to the data-transfer and processing device 14. All of the advantages of the personal computer and of the corresponding programs together with the data-transfer and processing device 14 are able to be utilized. Furthermore, a flow of data is possible from the data-transfer and processing device 14 to the personal computer 22 in order, for example, to display information from the control devices, 4, 5 and 6 from the printing presses 1, 2 and 3, respectively, on the visual display unit, or to further process or store the information in the personal computer 22. In this regard, there is noted, once again as an example, the transfer of data concerning labor and materials to a program for generating invoices or historical-costing calculations.

For a first-time or initial printing job, essential data, such as sheet size, number of sheets, stock, customer, for example can be inputted by means of a personal computer. The job is allocated to one of the printing units likewise by means of a suitable input, with the previously inputted data being transmitted to the control device of the selected printing press. In this regard, furthermore, the data from the printing-plate reader 27 can be transmitted to the central control apparatus. Also, the determination as to whether this is a first-time job can be made in the central control apparatus.

More specifically, however, the setting of the printing press for a first-time job is normally performed with the appertaining operator unit 7, 8 and 9. This data is then stored with the aid of the data-transfer and processing apparatus 14.

In the case of a repeat printing job, a determination is made in the central control apparatus as to which printing press is to process the job. If this printing press is different from the printing press on which the first-time job was performed, the data retrieved from the mass storage device 26 is automatically converted to the characteristics of that printing press which is now to be used for the repeat job, and is outputted.

The respective data to be stored and to be transmitted may include the following information:

Cassette number, job number, date, customer, type of work, stock, g/m$^2$, sheet size, number of sheets, printing, stroke/color sequence, ink manufacturer, ink number, ink feed-roller rate, use of ink distributor, inking setting, siccative %, dampening-solution addition %, manufacturer, alcohol %, pH value, circumference/plate, packing rubber, respectively, for each of the printing units, type of rubber blanket, slur: yes/no, type of anti-set-off or dusting medium/manufacturer, quantity, pile height, remarks, printer, assistant.

The personal computer 22 is connected via a data line to a driverless transport system 36, which automatically supplies the stock to the printing presses and effects the transport of the printed products. A data-transfer device 35 (merely suggested in the FIG. 1), for example a modem 35, permits both the receipt and transmission of data. Thus, for example, job data or data from a printing-plate reader can be fed to the device according to the invention. Furthermore, an interrogation or inquiry may be made of fault messages and error reports by a maintenance service which could probably be at a remote location.

The data-transfer and processing device 14 is preferably in the form of a plug-in card and is inserted into an expansion slot in the personal computer. If necessary, it is also possible to occupy a plurality of expansion slots, especially if a large number of control devices are to be connected. Depending upon the individual requirements, a mass storage device assigned to and located in the personal computer 22 may be used instead of the storage device or memory 26.

Figure 2:
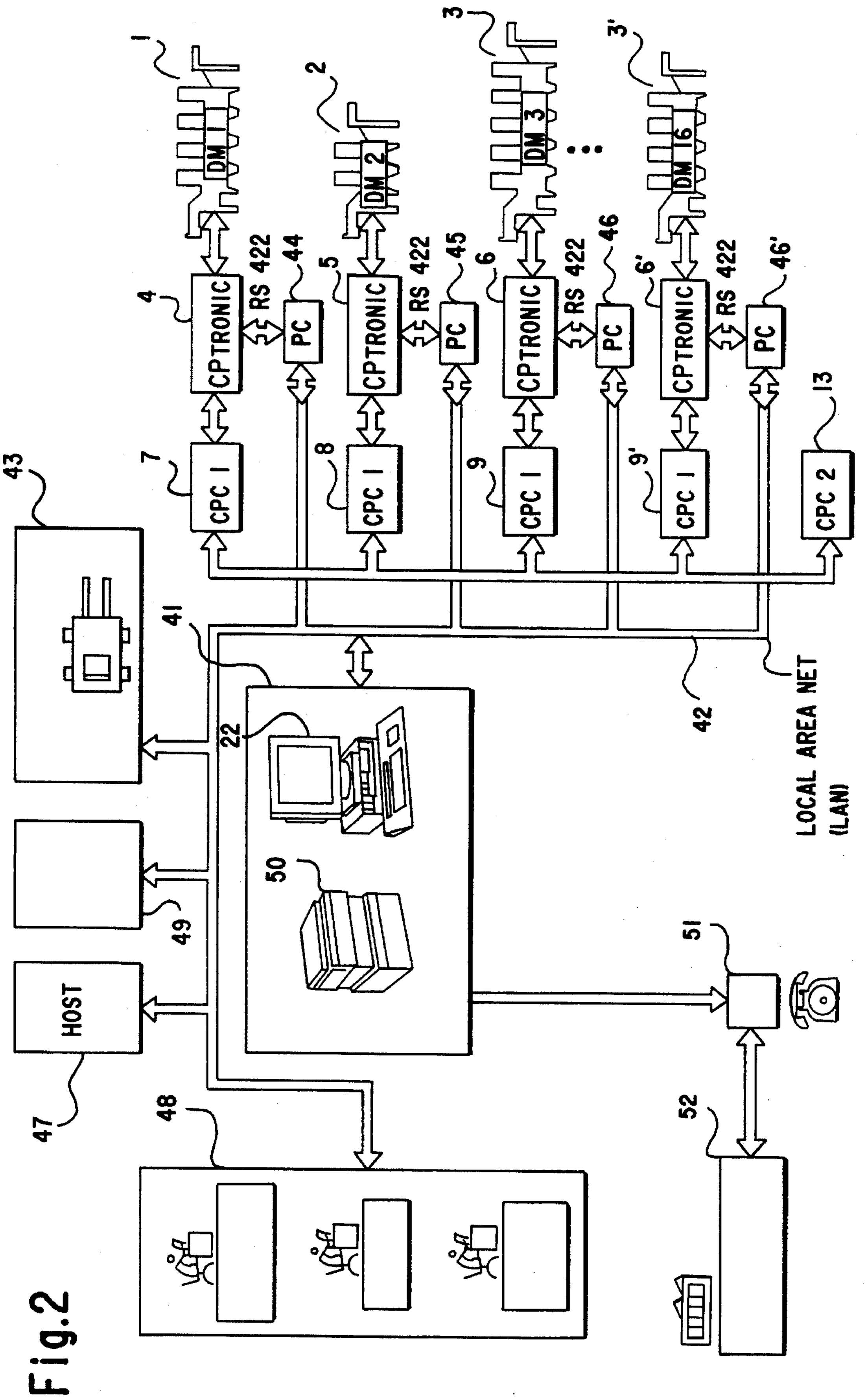
FIG. 2 is a block diagram of a second embodiment of FIG. 1.

The embodiment of the invention illustrated in FIG. 2 is likewise applied to a plurality of printing presses 1 to 3 and 3', and includes control devices 4 to 6 and 6' and operator units 7 to 9 and 9', respectively associated therewith. In the interest of clarity, only four printing presses, four control devices and four operator units are provided in FIG. 2. In the embodiment according to the invention, however, as many as 16 printing presses and associated devices and units may be connected. Each of the control devices 4 to 6 and 6' has a personal computer 44 to 46 and 46', respectively, assigned thereto which is connected via a conventional RS 422 interface to the respective control device.

A suitable network 42 is provided for data transfer between the personal computers 44 to 46 and 46' and a central control apparatus 41, and is connected in the central control apparatus 41 to a personal computer 22. The network 42 is a conventional local area network (LAN), and of the type marketed, for example, under the names Token Ring and Ethernet, and which is suitable for personal computers.

Besides the personal computers 44 to 46 and 46', a driverless transport system including stores management 43, a host computer 47, which performs all data-processing tasks necessary for the operation of the printing shop, as well as additional personal computers 48 for estimating cost, historical costing, job recording and operating-data recording, are also connected to the network 42. Further data-processing devices can be connected to the network 42 via other interfaces 49.

In addition to a personal computer 22, the central control apparatus 41 also includes a suitable printer 50. Furthermore, the central control apparatus 41 is connected via a modem 51 for data communication via a suitable network, such as the telephone network, datex networks or an ISDN network. Via the modem 51, it is possible, if necessary, to establish a connection with the manufacturer of the printing presses or to an agency 52 in order to exchange service data, such as information regarding spare parts, and other communications.

Compared with the embodiment of the invention according to FIG. 1, the embodiment of FIG. 2 has the advantage that various networks obtainable in the market place and manufactured in large numbers are used for data transfer, a graphics-oriented (language-independent) data transfer being possible. Furthermore, the possibility exists of establishing additional communications between all points in the entire system.

Figure 3:
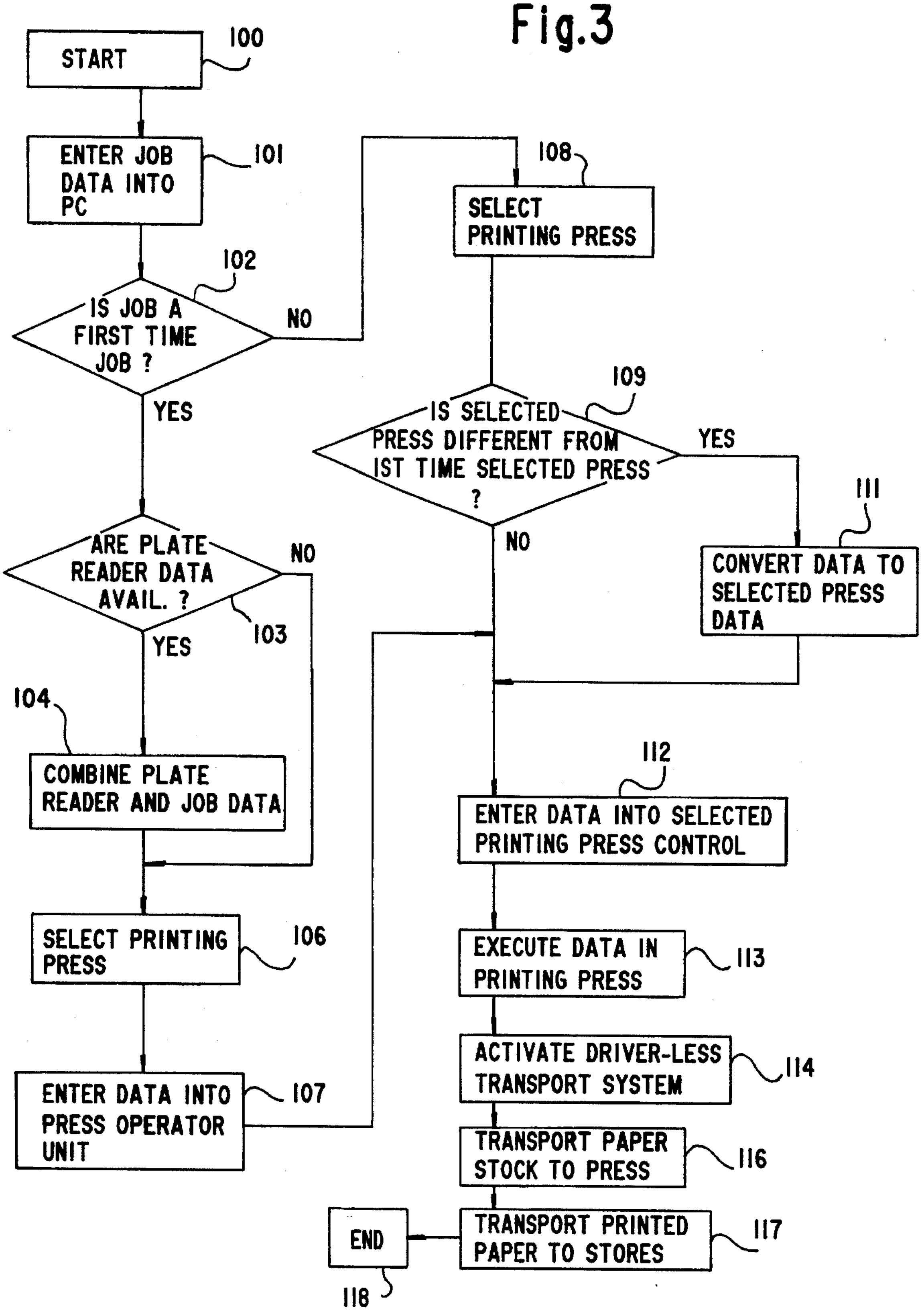
FIG. 3 is a flow chart of the control system.

FIG. 3 is a flow chart showing the steps of performing a printing job. After a start 100, job data are entered into a personal computer (PC) 22, which determines from the data if this is a first-time printing job in a decision step 102. If affirmative, a determination is made in the decision step 102, followed by a determination in a decision step 103 to determine if plate-reader data are available from a plate reader 27. If affirmative, the plate-reader data and job data are combined in a step 104, which is skipped if plate-reader data are not available. Next, a printing press is selected in a step 106 based upon press availability and capability to perform the job, followed by entry of the combined data into the press operator control unit 7 in a step 107, wherein the data can be reviewed by the press operator. Next, the data are entered into the printing-press control in a step 112, and the data are executed by printing the job in a step 113. Next, the driver-less transport system 36 is activated in a step 114 to transport new paper stock to the press in a step 116 and transport printed paper to stores in a step 117. Returning now to the step 102, if it is determined that the job is not a first-time printing job, the received data is then known to be good data, and a suitable press is selected in a step 108. If the selected press is determined to be different from the first-time selected press in a decision step 109, the data then has to be converted to match the requirement of the new press selected in a step 111. In the next step, the converted data or the previously used data is then entered into the selected press in step 112, and executed as described hereinbefore, until the final step, END 118, is entered.

We claim:

1. Apparatus for implementing a system of controlling a plurality of printing presses, comprising a respective control device assigned to each of said printing presses, a central control apparatus connected to said control device of each of said printing presses, said central control apparatus including a printing plate reader for reading ink distribution data from a printing plate, a computer in said central control apparatus, a data-transfer and processing device in said central control apparatus connected to said computer for transmitting data to said control device assigned to each of said printing presses, said data including ink distribution data from the printing plate reader for controlling a given one of said printing presses for printing a given printing job independently of said computer, a microprocessor in said data transfer and processing device for controlling flow of information between said computer and said control device and a data transmission network interconnecting said control device, said central control apparatus, said printing plate reader, said computer, and said data-transfer and processing device.

2. Apparatus according to claim 1, including data transfer means for feeding instructions, data operating systems, and applications programs from said computer to said data-transfer and processing device.

3. Apparatus according to claim 1, wherein said data-transfer and processing device comprises a plurality of inputs/outputs for communicating with the control devices, respectively, of the printing presses, and an input/output for communicating with said computer.

4. Apparatus according to claim 3, wherein said data-transfer and processing device includes further inputs/outputs, and at least one mass storage device communicating with said further inputs/outputs.

5. Apparatus according to claim 3, wherein said data-transfer and processing device further includes a third input/output, and a printing-plate reader communicating with said printing-plate reader via said third input/output.

6. Apparatus according to claim 1, including a densitometer connected to said control devices for measuring print quality.

7. Apparatus according to claim 1, including a printing-plate reader connected to said data-transfer and processing device for reading a printing plate.

8. Apparatus according to claim 1, wherein said computer is a personal computer, and said data-transfer and processing device is formed as a plug-in card, and an expansion slot in said personal computer for receiving said data-transfer and processing device.

9. Apparatus according to claim 1, including a driverless transport system connected to said central control apparatus.

10. Apparatus for controlling a plurality of printing presses comprising a central control apparatus, a printing plate reader for reading ink distribution data connected to said plurality of printing presses, a computer, a data network for transmitting printing data including ink distribution data to respective control devices assigned to respective printing presses.

11. Apparatus according to claim 10, including further data-processing devices connected to said data network.

12. Apparatus according to claim 10, including further data-communication devices connected to said central control apparatus.

13. Apparatus according to claim 10, including a driverless transport system connected to said data network.

14. Method for controlling production from a plurality of printing presses including a central control apparatus a data transfer and processing device, a microprocessor in said data transfer and processing device, including a printing plate reader for reading ink distribution data from a printing plate connected with each of the printing presses, and a data transmission network interconnecting said central control apparatus, said printing plate reader, said data transfer and processing device, and said microprocessor; a printing press control device, and an operator unit connected to each of the printing presses; and data communications lines interconnecting the printing presses, the control device, the microprocessor, and the operator unit for each of the printing presses with the central control apparatus; the method which comprises the steps of:

entering into the central control apparatus printing job data and machine specific data, said printing job data including ink distribution data from the printing plate reader;

transmitting with said data communications lines the job data and machine specific data to the respective control devices of the printing presses;

controlling with said microprocessor the flow of job data and machine specific data to the respective control devices of the printing presses; and controlling a given printing press with the job, data and the machine specific data, for performing a given printing job.

15. Method according to claim 14, which includes transmitting the data from the control device to the central control apparatus after the given printing job is completed.

16. Method according to claim 14, which includes transmitting the data from the control device to the central control apparatus during the performance of the given printing job.

17. Method according to claim 14, which includes writing the data to a storage device via the central control apparatus, after performing the given printing job on the given printing press, when the given printing job has been performed only for a first time.

18. Method according to claim 17, which includes, in the event the printing job is a repeat job, reading the data from the storage device and feeding the data from the central control apparatus to the control device of one of the printing presses.

19. Method according to claim 18, which includes, for the repeat printing job, changing the data when one of the printing presses other than the given printing press is selected for performing the repeat printing job.

* * * * *